No. 896,695. PATENTED AUG. 18, 1908.
J. W. HARVEY.
NUT LOCK.
APPLICATION FILED SEPT. 10, 1907.

Inventor
J. W. Harvey.

Witnesses

By
Racey, Attorneys

UNITED STATES PATENT OFFICE.

JOHN W. HARVEY, OF DENVER, COLORADO, ASSIGNOR OF ONE-HALF TO HERBERT G. HODDING, OF SALIDA, COLORADO.

NUT-LOCK.

No. 896,695.      Specification of Letters Patent.      Patented Aug. 18, 1908.

Application filed September 10, 1907. Serial No. 392,184.

*To all whom it may concern:*

Be it known that I, JOHN W. HARVEY, a citizen of the United States, residing at Denver, in the county of Denver and State of Colorado, have invented certain new and useful Improvements in Nut-Locks, of which the following is a specification.

This invention has for its object an improved nut lock designed to effectively prevent a nut from working loose due to the vibration of the parts or other conditions tending to produce this result, and the invention consists in certain constructions, arrangements and combinations of the parts that I shall hereinafter fully describe and claim.

Figure 1:
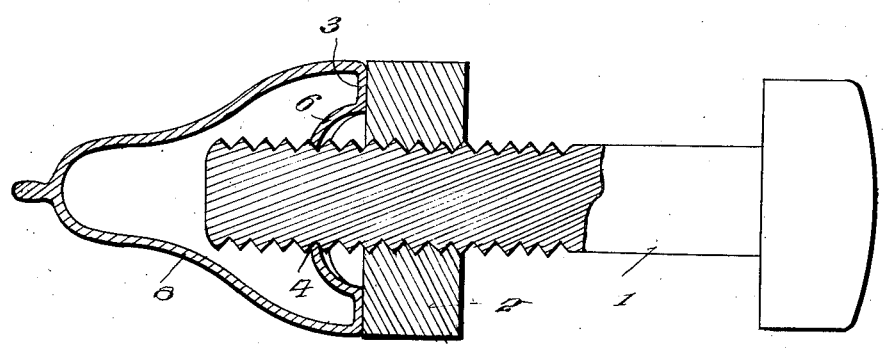
Figure 2:
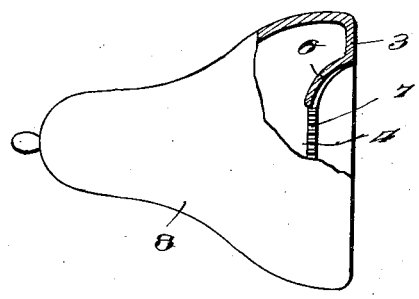
Figure 3:
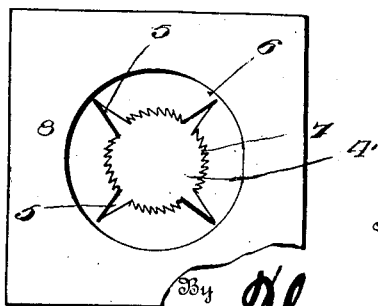

For a full understanding of the invention, reference is to be had to the following description and accompanying drawings, in which:

Figure 1 is a longitudinal sectional view of my improved nut lock applied to a bolt; Fig. 2 is a detail side elevation of the device, partly broken away; and, Fig. 3 is an end view.

Corresponding and like parts are referred to in the following description and indicated in all the views of the drawings by the same reference characters.

The nut lock embodying the present invention is shown as applied to a bolt 1 and a nut 2 of the conventional construction. Specifically describing the locking device, it will be observed that the same embodies a plate 3 having a central bolt receiving opening 4 stamped therefrom, the said opening being diametrically somewhat smaller than the bolt. Radiating from this opening 4 are slits 5 which form a plurality of spring tongues 6, the said tongues being deflected outwardly and having their extremities inclined inwardly so as to have a spring engagement with the bolt. It will also be observed that the ends of these tongues 6 have an approximately spiral arrangement and are oblique to the plane of the plate corresponding to the pitch of the threads upon the bolt and that the plate is threaded upon the bolt in a manner identical with the nut. The extremities of the spring tongues 6 are formed with curved recesses, the edges of which are serrated to form a plurality of teeth 7 on the extremity of each tongue, said teeth being inclined and permitting the plate to be threaded upon the bolt, while at the same time they tend to bite into the threads when an attempt is made to remove the plate from the bolt. The locking plate is provided with a casing 8 designed to receive the end of the bolt, as clearly illustrated in the drawing.

In the application of the invention, the plate 3 with the casing is turned upon the bolt so that the plate will bear tightly against the nut, the outward pressure exerted by the nut serving to force the spring tongues into close engagement with the bolt.

Having thus described the invention, what is claimed as new is:

The combination of a bolt, a nut coöperating with the bolt, a locking plate formed with a bolt receiving opening and provided with tongues surrounding the bolt receiving opening and having a threaded engagement with the bolt, the ends of the tongues being provided with inclined teeth, and a casing carried by the locking plate for receiving the end of the bolt.

In testimony whereof I affix my signature in presence of two witnesses.

JOHN W. HARVEY. [L. S.]

Witnesses:
    R. J. CARROLL,
    HENRY W. HALER.